United States Patent [19]
Yamamoto et al.

[11] Patent Number: 5,544,387
[45] Date of Patent: Aug. 13, 1996

[54] CURTAIN ATTACHMENT CONNECTOR ASSEMBLY AND CURTAIN ATTACHMENT CONNECTOR

[75] Inventors: Toru Yamamoto, Osaka; Akihiko Hisano, Nara-ken; Toshiaki Takizawa, Toyama-ken, all of Japan

[73] Assignee: Yoshida Kogyo K.K., Tokyo, Japan

[21] Appl. No.: 228,261

[22] Filed: Apr. 15, 1994

[30] Foreign Application Priority Data

Apr. 15, 1993 [JP] Japan ................................. 5-019284
May 27, 1993 [JP] Japan ................................. 5-028040

[51] Int. Cl.$^6$ ........................... E05D 15/00; A47H 13/00
[52] U.S. Cl. ..................... 16/87.4 R; 16/87.2; 16/94 D; 24/306; 24/716; 24/703.1; 24/598.4
[58] Field of Search .................... 16/87.4 R, 87.2, 16/94 D; 24/306, 716, 703.1, 598.4, 598.1; 106/345, 330

[56] References Cited

U.S. PATENT DOCUMENTS

| | | | |
|---|---|---|---|
| 3,175,243 | 3/1965 | Weber | 16/87.4 R |
| 3,235,926 | 2/1966 | Mates | 24/306 |
| 3,286,299 | 11/1966 | Golden | 16/87.4 R |
| 3,434,524 | 3/1969 | Fein . | |
| 3,951,196 | 4/1976 | Salzmann . | |
| 4,846,249 | 7/1989 | Cooper et al. | 160/345 |
| 5,012,552 | 5/1991 | Wulf | 16/87.2 |
| 5,109,912 | 5/1992 | Gary . | |
| 5,291,632 | 3/1994 | Akashi | 16/87.2 |

FOREIGN PATENT DOCUMENTS

| | | | |
|---|---|---|---|
| 0499461 | 8/1992 | European Pat. Off. . | |
| 1144449 | 2/1963 | Germany | 16/87.2 |
| 1654095 | 2/1971 | Germany . | |
| 40-27706 | 7/1963 | Japan . | |
| 57-142986 | 9/1982 | Japan . | |
| 2-107387 | 8/1990 | Japan . | |
| 4-104909 | 9/1992 | Japan . | |
| 6401290 | 8/1964 | Netherlands . | |
| 984214 | 2/1965 | United Kingdom | 16/87.2 |
| 1143552 | 2/1969 | United Kingdom . | |

*Primary Examiner*—Chuck Y. Mah
*Attorney, Agent, or Firm*—Hill, Steadman & Simpson

[57] ABSTRACT

A molded curtain attachment connector for connecting a curtain hanger member and the top edge of a curtain includes a fastener member having a fastener surface releasably engageable with the fastener surface of a surface-type separable fastener member attached to the curtain along a top edge thereof, a hook member integrally formed with the fastener member and adapted to be attached to, and detached from, the curtain hanger member, and a blocking means disposed at the opening of the hook member for preventing another article from entering the hook member through the opening, the blocking means being deformable toward the inside of the hook member when subjected to an external force of a predetermined intensity. The molded curtain attachment connector thus constructed can be manufactured with high production efficiency, facilitates the curtain attaching/detaching operation, ensures smooth opening and closing operation of the curtain, and can be colored in various manners.

9 Claims, 6 Drawing Sheets

CURTAIN ATTACHMENT CONNECTOR ASSEMBLY AND CURTAIN ATTACHMENT CONNECTOR

BACKGROUND OF THE INVENTION

1. Field of the Invention

The present invention relates to a curtain attachment connector used for connecting a curtain hanger member, such as a curtain runner, and a curtain and the like.

2. Description of the Prior Art

Most curtains used in hospitals or hotels are held on a lease and they are replaced and laundered periodically. To accomplish a curtain replacement work with high efficiently, measures should be taken to facilitate the curtain attachment and detachment processes. Taking it into account, various attempts, as disclosed in Japanese Patent Publication No. 40-27706 and Japanese Utility Model Laid-open Publication Nos. 57-142986 and 2-107387, have heretofore been made to facilitate attachment and detachment of a curtain relative to curtain runners mounted on a curtain guide member, such as a curtain rail or a guide bar.

For example, a curtain attachment connector disclosed in Japanese Utility Model Laid-open Publication No. 2-107387 includes a curtain attachment portion formed integrally with a curtain runner, and one of two companion male and female fastener members of a surface-type separable fastener bonded to one side of the curtain attachment portion. The fastener member is forced into and out of engagement with the other or mating fastener member which is attached to the top edge of a curtain. With the curtain attachment connector, the curtain can be easily attached to, and detached from, the curtain runner.

However, since the surface-type fastener member is formed by weaving or knitting, the disclosed curtain attachment connector can only be produced with limited efficiency and is unable to retain a desired degree of engagement force or strength. Those curtain attachment connectors disclosed in other Japanese publications also have a woven or knitted surface-type fastener member and, hence, they have the same difficulties as described above.

With the foregoing difficulties in view, the present inventor has previously proposed an improved curtain attachment connector such as disclosed in Japanese Utility Model Laid-open Publication No. 4-104909. The improved curtain attachment connector includes a plate-like fastener member molded of synthetic resin and having on its one surface a number of hooks arranged in rows and tiers, and an attachment portion composed of two metal wires detachably engaged at their front ends to hook the attachment portion on a curtain runner, the fastener member and the attachment portion being integrally molded by injection molding.

The curtain attachment connector disclosed in Japanese Utility Model Laid-open Publication No. 4-104909 is advantageous in that since the fastener member is a molded product, the hooks of such molded fastener member, when combined with a mating fastener member, can produce an engagement forth or strength which is much greater than that produced by the hooks formed by a monofilament on the conventional woven or knitted fastener member. However, a drawback is that the metal attachment portion requires a separate manufacturing process and makes the injection molding process complicated because the metal attachment portion should be molded in the fastener member as an insert.

Taking a final form of the curtain attachment connector into consideration, the metal attachment portion must have a snap spring property and hence is made of spring steel. Such attachment portion requires a particular design consideration which leads to the corresponding increase in the production cost. On the other hand, the curtain runners are generally molded of synthetic resin and hence susceptible to abrasive wear when it is used in combination with the metal attachment portions. The synthetic resin curtain runners are, therefore, unfit for a long period of use. Furthermore, the metal attachment portion and the synthetic resin fastener member are made from different materials, so that they are not well-matched in appearance and also not suited for coloring in the same color tone. It is, therefore, desirable that whenever possible, the attachment portion and the fastener member are integrally molded of a single material.

SUMMARY OF THE INVENTION

In view of the prior art described above, it is an object of the present invention to provide a curtain attachment connector which is molded of synthetic resin as a whole to over-come the above enumerated drawbacks concerning the production and final form of the prior device disclosed in Japanese Utility Model Laid-open Publication No. 4-104909 while maintaining various advantages of the same, and which is able to prevent an attachment portion from getting entangled with another article and can be easily attached to and detached from a curtain runner.

To attain the foregoing object, the invention provides a curtain attachment connector molded of synthetic resin and adapted to be interposed between a curtain hanger member slidable along an elongated guide member and a curtain for connecting the curtain hanger member and a top edge of the curtain, the curtain including a separable fastener member mounted on and along the top edge thereof and having a male or a female fastener surface. The curtain attachment connector comprises: a plate-like fastener member having a fastener surface releasably engageable with the fastener surface of the separable fastener member of the curtain; a hook member integral with the fastener member and adapted to be attached to, and detached from, the curtain hanger member, the hook member having an opening; and blocking means disposed at the opening of the hook member for preventing another article from entering the hook member through the opening, the blocking means being deformable toward the inside of the hook member when an external force of a predetermined intensity is exerted thereon.

According to a preferred embodiment, the blocking means comprises a resilient strip extending across the opening of the hook member and integrally joined at opposite ends to the hook member. At least one of the opposite ends of the resilient strip forms a frail portion which is breakable under the external force. As an alternative, the resilient strip has a notch located centrally between the opposite ends thereof and forming the frail portion. The resilient strip may be integrally joined at its one end to the hook member, the other end being slightly spaced from the hook member.

The curtain attachment connector of the invention may be used in the loose or untied state or the interconnected or tied state. In the latter mode of application, a plurality of curtain attachment connectors are interconnected by at least one flexible cord, with the respective fastener members mounted on the flexible cord along the length thereof at predetermined intervals. Preferably, the flexible cord and each of the curtain attachment connectors are integrally molded as a unitary curtain attachment connector assembly.

When the curtain attachment connector is used in the loose or untied state, a necessary number of curtain runners are slidably mounted on a curtain rail, and after that the hook member of the curtain attachment connector is hooked on a ring of each of the curtain runners, thus attaching the curtain attachment connector to the curtain runner. In this instance, the blocking means (resilient strip) disposed at an opening of the hook member is broken at one or both ends thereof, or resiliently deformed into the hook, under the ordinary attachment force exerted thereon, so that the hook member and the ring can be coupled smoothly. Since the resilient strip does not undergo resilient deformation nor is broken when the exerted force is less than the ordinary attachment force, the hook member is prevented by the resilient strip from interlocking or catching the hook of another curtain attachment connector. When the resilient strip remains on the hook member in the form of a cantilever, the hook once attached to the ring of the curtain runner is prevented from detaching off the ring by means of the resilient strip.

Then, for example, the fastener surface of the surface-type separable fastener member which is mounted on and along the top edge of the curtain is forced against the fastener surface of the fastener member of each curtain attachment connector, thus attaching the curtain to the curtain runners. When the curtain is to be detached from the curtain runners, separation is quite readily be effected by progressively peeling off the curtain from either end thereof.

When a curtain is to be attached to a curtain rail using a curtain attachment connector assembly which is composed of a series of curtain attachment connectors interconnected by at least one flexible cord, a necessary number of curtain runners are slidably mounted on a curtain rail with the respective rings projecting from the underside of the curtain rail. Then, the respective hook members of the curtain attachment connectors are hooked, one by one, on the rings of the corresponding curtain runners, thus attaching the curtain attachment connectors to the curtain runners. In this instance, one end of the flexible cord is secured to the corresponding end of the curtain rail by an appropriate means. Then, the opposite end of the flexible cord is pulled along the curtain rail. Now, the curtain attachment connector assembly is aligned in parallel spaced relation to the curtain rail, with the curtain attachment connectors laterally spaced at predetermined intervals. Subsequently, a series of surface-type separable fastener members which are mounted on and along the top edge of the curtain at a predetermined intervals are forced one by one against the fastener members of the corresponding curtain attachment connectors. The curtain is thus attached to the curtain rail by the curtain attachment connector assembly. In this mode of application, the blocking member disposed at the opening of each respective hook demonstrates the same function as described above.

Partly due to the flexibility of the cord interconnecting the individual curtain attachment connectors, and partly due to the regularly spaced arrangement of the fastener members on the curtain, the top edge of the curtain is not rendered rigid but still holds an adequate degree of flexibility. Accordingly, the curtain can be opened and closed with extremely smooth sliding motion of the curtain runners. The pitch of the fastener members on the curtain is preferably larger than the pitch of the curtain attachment connectors. With this difference in pitch, a series of folds or pleats are formed on the curtain even when the curtain is in its fully closed position. With the use of the curtain attachment connector assembly, the curtain while in its fully opened position are folded regularly and provides an aesthetic appearance.

Each individual curtain attachment connector and the flexible cord of the curtain attachment assembly are integrally molded on an injection molding machine. In production, the flexible cord is set in a mold assembly across a mold cavity for molding the fastener member of one curtain attachment connector and then intermittently advanced through the mold assembly. While the flexible cord is at rest, melted synthetic resin material is injected into the mold cavity, thus forming one curtain attachment connector at a time. The curtain attachment connector assembly can, therefore, be manufactured with high production rate and at a low cost. The curtain attachment connector assembly has a continuous string-like configuration and hence is easy to handle, store and control. In use, the continuous curtain attachment connector assembly is cut into desired lengths.

The above and other objects, features and advantages of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Figure 1:
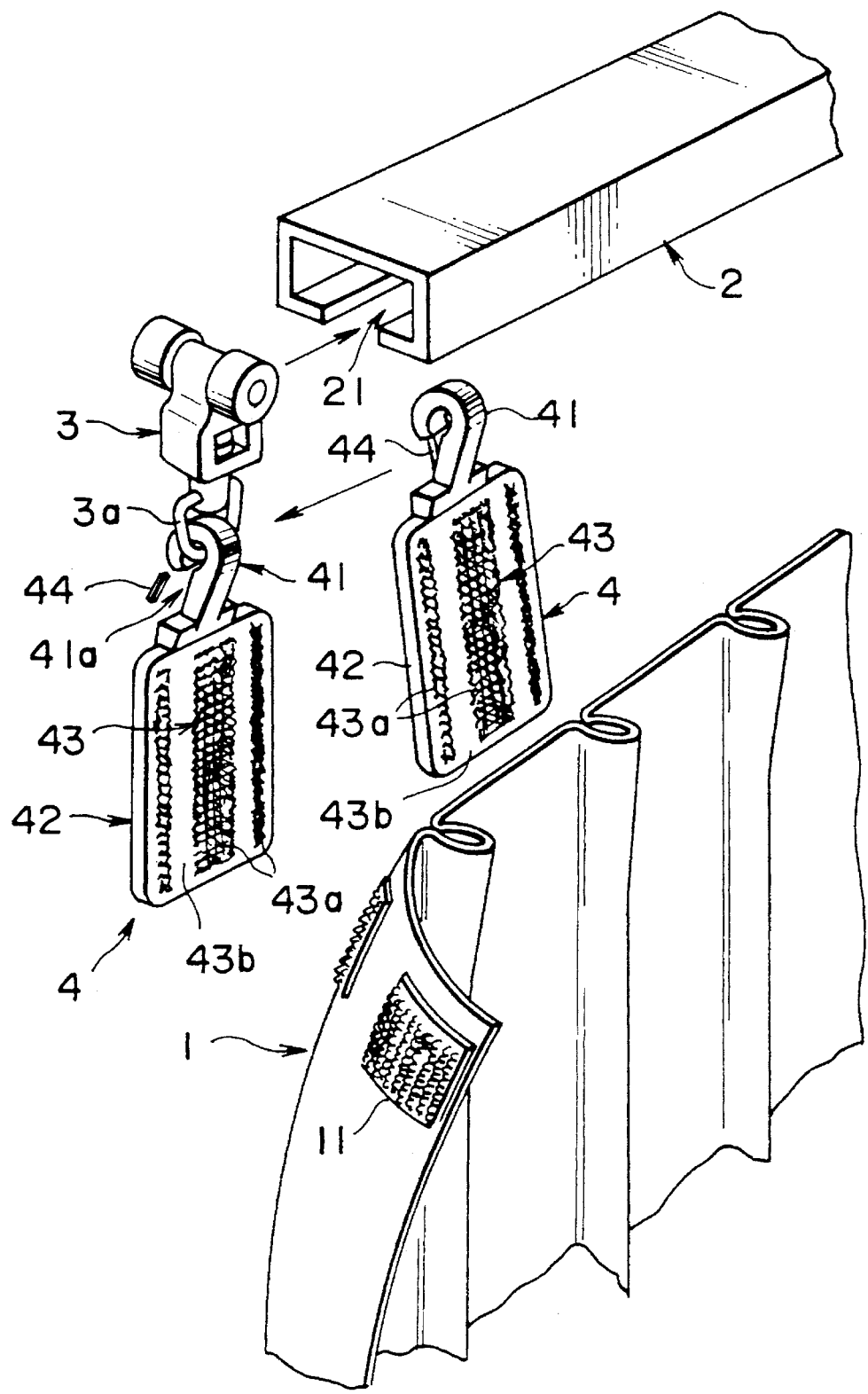
FIG. 1 is a perspective view illustrative of the manner in which a curtain is attached to a curtain runner via a curtain attachment connector according to one embodiment of the present invention.

Referring now to the drawings, wherein like reference characters designate like or corresponding parts throughout the several views, there is shown in FIG. 1 a curtain attachment connector 4 used to attach a curtain 1 to each individual curtain runner 3. The curtain 1 has a series of female or looped fastener tapes 11 (two being shown) attached by sewing to the curtain 1 along a top edge thereof and equally spaced at predetermined intervals. The looped fastener tape forms one part (female part) of a surface-type separable fastener generally known as a hook-and-loop fastener. Numeral 2 indicates a curtain rail constituting a guide member. The curtain rail 2 is composed of an elongated C-section bar having a slit-like opening 21 extending in and along the bottom wall of the curtain rail 2.

In the illustrated embodiment, the curtain attachment connector 4 is generally composed of a hook member 41 adapted to be hooked on a swivel loop or ring 3a of the curtain runner 3, and a plate-like fastener member 42. The fastener member 42 has one surface from which a number of hooks 43a project. The hooked surface thus constitutes a fastener surface 43 including the hooks 43a. The hooks 43a are arranged in horizontal rows and vertical tiers on FIG. 1.

The number of the vertical hook tiers are nine, the nine tiers being divided into three groups: a central group including five vertical tiers, and left and right side groups each including two vertical tiers and each disposed on one side of the central group of vertical tiers, with a predetermined space defined therebetween. The space is formed by an elongated flat land 43b. The flat land 43b has a width large enough to receive an ejector pin (not shown) when the curtain attachment connector 4 is produced by injection molding, as described later. The elongated flat land 43b may replaced by discrete lands provided locally on the fastener surface 43 according to the position of the ejector pins. In the illustrated embodiment, all the hooks 43a are directed in the same direction with their bent ends faced upwardly. As an alternative, the hooks 43a in the central group of vertical tiers may be directed upwardly, while the hooks 43a in the left and right adjacent tiers via the flat lands 43b are directed downwardly. Any other combination regarding the orientation of the hooks in rows and tiers is possible.

One important feature of the curtain attachment connector 4 is that the hook member 41 and the plate-like fastener member 42 are integrally molded of a synthetic resin material. Another important feature is that a blocking means 44 is disposed at an opening 41a of the hook member 41 for preventing another article from entering the hook member 41 through the opening 41a as long as an external force exerted on the blocking means 44 is not greater than a predetermined intensity.

Figure 2:
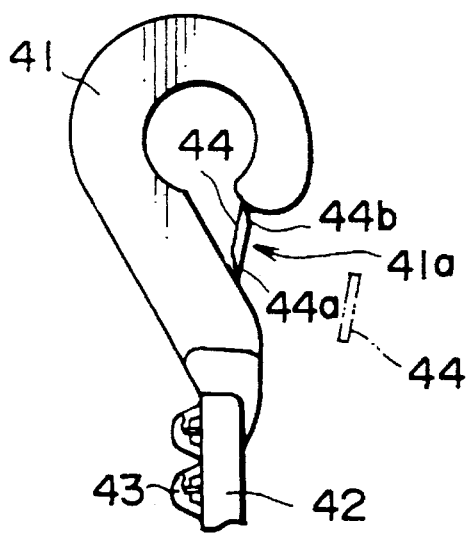
FIG. 2 is an enlarged side view of showing a portion of the curtain attachment connector including a hook member and a blocking means associated therewith.

The blocking means 44 comprises a resilient strip normally extending across the opening 41a of the hook member 41 to block up or close the opening 41a. As best shown in FIG. 2, the resilient strip 44 is integrally formed with the hook member 41 so that opposite ends 44a, 44b of the resilient strip 44 are integrally joined with opposite portions of the hook member 41 facing the opening 41a. A joint portion formed between the end 44a of the resilient strip 44 and the hook member 41 has a sharp corner. Since the resilient strip 44 has at least one joint portion which is thinner than the hook member 41, each end 44a, 44b of the resilient strip 44 forms a weak or frail portion which is breakable when an external force of a predetermined intensity is exerted thereon. To attach the curtain attachment connector 4 to the curtain runner 3, the resilient strip 44 is forced against the ring 3a of the curtain runner 3. When the force exerted on the resilient strip 44 reaches to the aforesaid predetermined intensity, the opposite ends 44a, 44b (frail portions) of the resilient strip 44 are broken. Thus, the resilient strip 44 is fully separated from the hook member 41, as indicated by the phantom lines in FIG. 2, and the opening 41a is fully opened. Upon separation of the resilient strip 44, the ring 3a moves through the opening 41a into the hook member 41 and is caught by the hook member 41. The curtain attachment connector 4 is now hung on the curtain runner 3.

Figure 3:
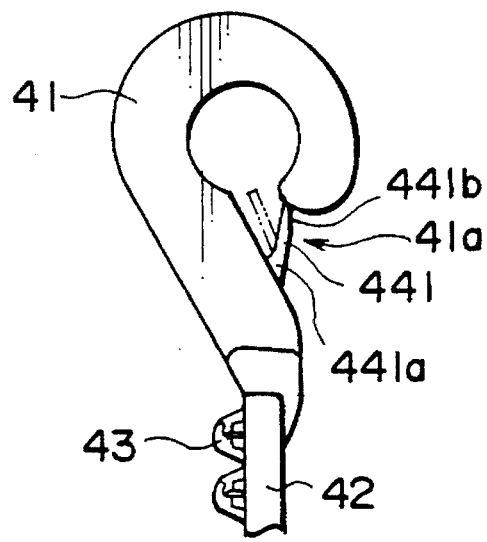
FIGS. 3 through 5 are side views similar to FIG. 2, showing various modifications for the blocking means.

FIG. 3 shows a modified form of the resilient strip 441 which differs from the resilient strip 44 of FIG. 2 in that only one end of the resilient strip 441 forms a frail portion. More specifically, one end 441a (lower end in FIG. 3) of the modified resilient strip 441 is integrally joined with a shank of the hook member 41 with its joint portion being rounded whereas the opposite end 441b (upper end in FIG. 3) integrally joined with a curved front end of the hook member 41 has a sharp corner edge. Due to the sharp edge, the upper end 441b is structurally weaker than the lower end 441a and hence forms a frail portion. When the hook member 41 is hooked on the ring 3a of the curtain runner 3, the resilient strip 441 is forced inwardly of the hook member 41. Continuing the pressure on the resilient strip 441, the force exerted on the resilient strip 441 increases to the predetermined level whereupon the upper end (frail portion) 441b of the resilient strip 441 is broken. The resilient strip 441 is now cantilevered at the lower end 441a, so that continuing movement of the hook member 41 relative to the ring 3a causes the resilient strip 441 to flex about its lower end 441a into the position indicated by the phantom lines shown in FIG. 3. Thus, the ring 3a is caught by the hook member 41, and after that the resilient strip 441 springs back to the initial position indicated by the solid lines, thus closing the opening 41a. The resilient strip 441 now constitutes a latch which serves to protect the ring 3a against detachment from the hook member 41.

Figure 4:
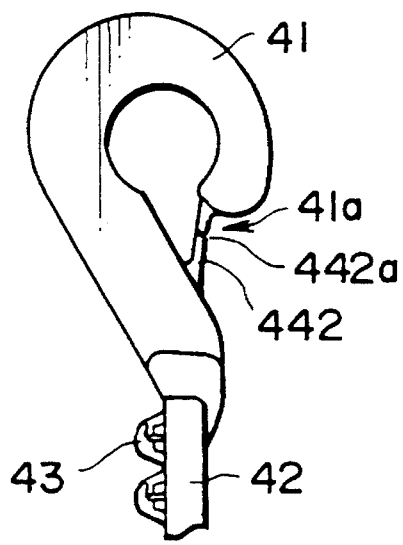
Figure 5:
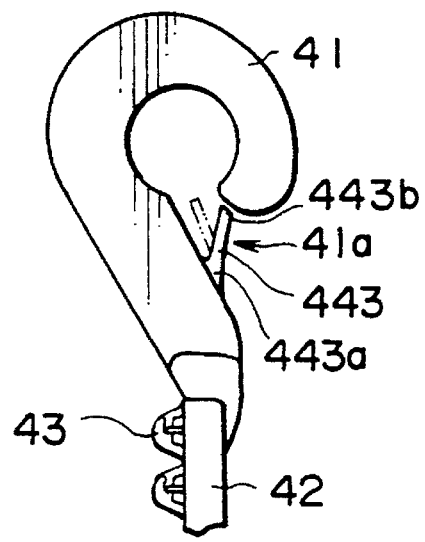

Another modified resilient strip 442 shown in FIG. 4 differs from the resilient strip 441 of FIG. 3 in that the frail portion is provided in the form of a notch 442a located at the midpoint of the resilient strip 442. When subjected to an external force of a predetermined intensity, the resilient strip 442 is broken at the notched central portion 442a. Two opposed, cantilevered resilient strip segments or portions formed after the break of the resilient strip 442 jointly serve as a latch which protects the ring 3a against detachment from the hook member The resilient strip 44; 441; 442 shown in the preceding embodiments are each secured at opposite ends to the hook member 41. As an alternative, the resilient strip may have a cantilevered structure such as shown in FIG. 5. The resilient strip 443 shown in FIG. 5 has one end 443a integrally joined with a shank of the hook member 41, the other end 443b being a free end and slightly spaced from a curved end of the hook member 41. The resilient strip 443 extends substantially across the opening 41a and hence prevents another article from entering the hook member 41 through the opening 41a. When an external force of a predetermined intensity is exerted, the resilient strip 443 resiliently flexes or bends inwardly about the fixed end 443a to the position indicated by the phantom lines in FIG. 5. When the external force disappears, the resilient strip 443 springs back to the solid-lined original position.

Figure 6:
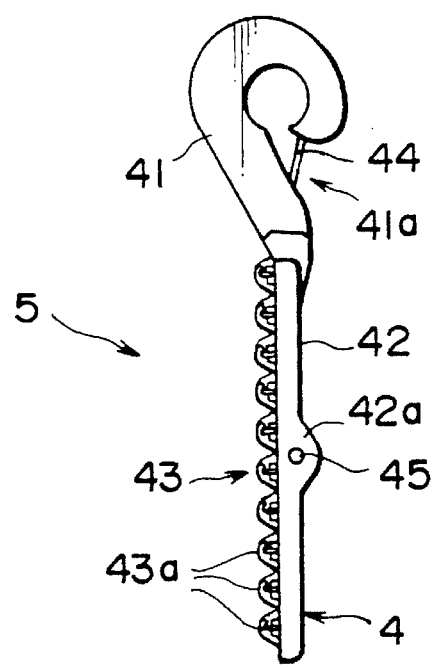
FIG. 6 is a side view showing a curtain attachment connector assembly including a series of curtain attachment connectors mounted on a flexible cord at predetermined intervals.
Figure 7:
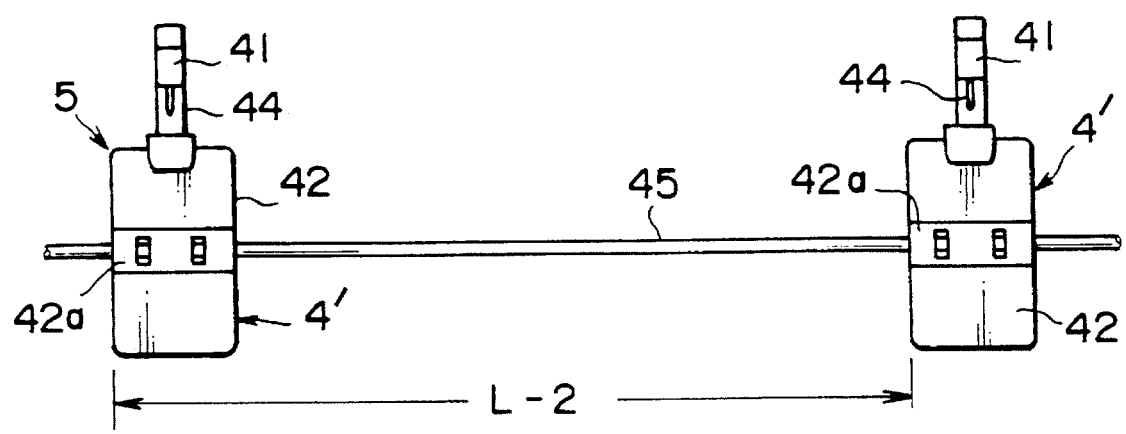
FIG. 7 is a rear view of the curtain attachment assembly shown in FIG. 6.

In the embodiment shown in FIG. 1, the curtain attachment connector 4 is used in the free, individual state. However, the present invention also covers another form of application in which a plurality of curtain attachment connectors are used in the interconnected or tied state, as shown in FIGS. 6 and 7. In the embodiment shown in FIGS. 6 and 7, a plurality of regularly spaced curtain attachment connectors 4 (two being shown in FIG. 7) are interconnected by a cord 45 so as to jointly form a curtain attachment connector assembly 5 (FIG. 7). Each individual curtain attachment connector 4 is substantially the same in structure and function as the curtain attachment connector 4 of FIG. 1 with the exception that the plate-like fastener member 42 has a transverse rib 42a formed on a surface opposite the fastener surface 43 (FIG. 6) to embrace an embedded portion of the cord 45. The rib 42a is located at the central portion of the fastener member 42. The hook member 41 which is integrally molded with the plate-like fastener member 42 is provided with a blocking means in the form of a resilient strip 44. The resilient strip 44 is structurally and functionally the same as one shown in FIG. 1.

As shown in FIG. 7, the curtain attachment connectors 4 of the curtain attachment connector assembly 5 is interconnected by the cord 45 extending transversely across respective central portions of the fastener members 42. The cord 45 may be a synthetic resin filament, a synthetic fiber yarn, a braided rope, a tape or the like and has a necessary degree of strength and flexibility. The fastener members 42 supported on the cord 45 along the length thereof are spaced at regular intervals or pitches L-2.

Figure 8:
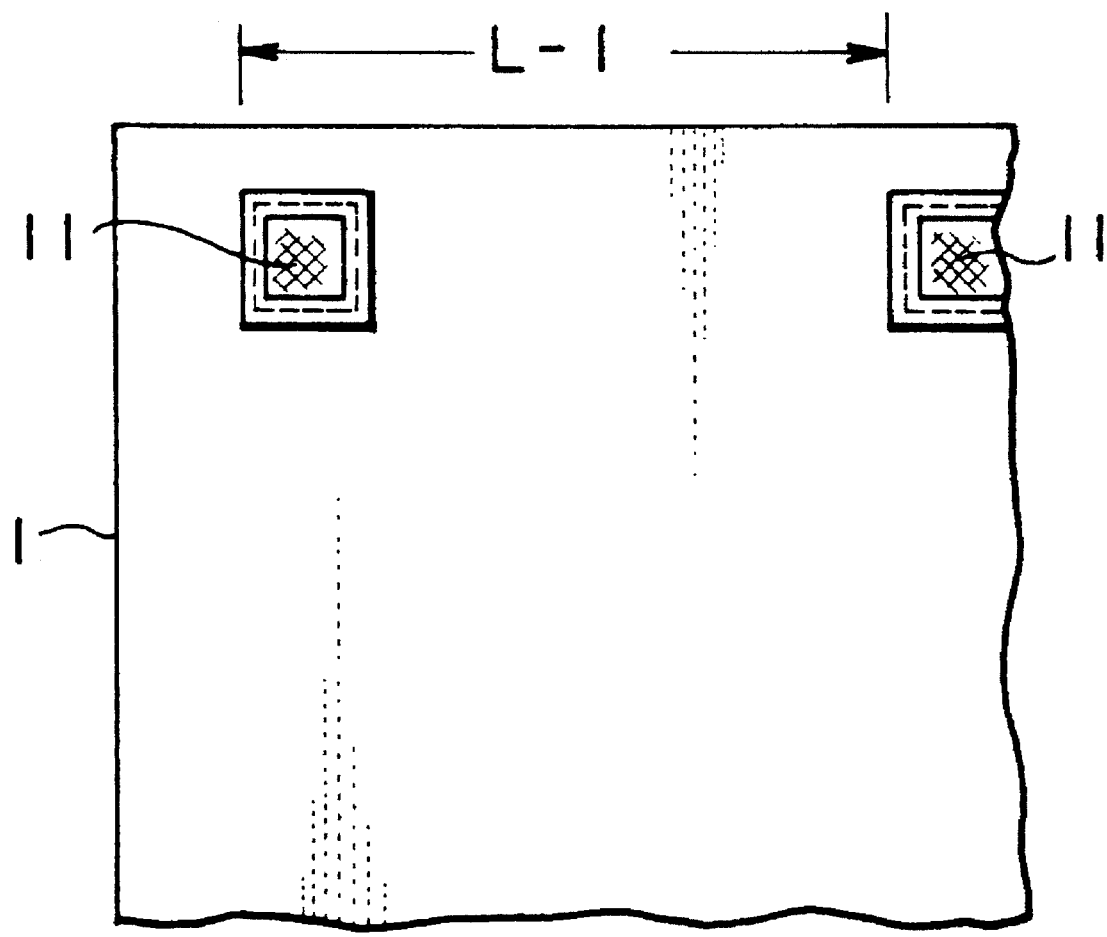
FIG. 8 is a schematic front elevational view showing a portion of the top edge of a curtain to be attached by the curtain attachment connector assembly of the invention.

The pitch L-2 (FIG. 7) of the fastener member 42 is smaller, by a predetermined distance, than the pitch L-1 (FIG. 8) of the female or looped fastener tapes 11 attached to the curtain 1 along the top edge thereof. This arrangement is particularly advantageous in that when the fastener members 42 of the respective curtain attachment connectors 4 are attached one by one to the corresponding female fastener tapes 11 of the curtain 1, each portion of the curtain 1 extending between two adjacent ones of the female fastener tapes 11 is folded by a distance equal to the pitch difference (L-1–L-2), and thus folded curtain portion automatically forms one pleat. When all the fastener members 42 are attached to the corresponding fastener tapes 11, a series of pleats are formed on the curtain 1. The pleats thus formed are regularly spaced and hence sightly in appearance.

The curtain attachment connector assembly 5 of the foregoing construction can be manufactured in a continuous length by using an injecting molding process which is repeated in timed relation to the intermittent feeding of the cord 45 so as to form or mold a succession of curtain attachment connectors 4 each integrated with one of longitudinally regularly spaced portions of the cord 45. To achieve the injection molding process, a mold assembly is first provided. The mold assembly has a mold cavity for forming a curtain attachment connector 4 including a fastener member 42, and a guide groove for receiving and guiding a continuous cord 45. Then, the cord 45 is set in the guide groove 45 and intermittently advanced through the guide groove. While the cord 45 is at rest, a melted synthetic resin material is injected into the mold cavity to mold one curtain attachment connector 4 at a time. The molded curtain attachment connector 4 has a cord portion embedded in the fastener member 42 thereof. By repeating the injection molding process, a string-like, continuous curtain attachment connector assembly 5 having a series of fastener members 42 integrally molded on the continuous cord 45 at predetermined intervals can be produced.

In the curtain attachment connector assembly 5 thus produced, each of the curtain attachment connectors 4 has a resilient strip 44 disposed at an opening 41a of the hook member 41. With the resilient strip 44 thus provided, each hook member 41 is prevented from interlocking with another hook member 41, and the cord 45 is prevented from getting entangled with any one of the hook members 41 through the associated opening 41a.

Then, a brief description will be given of a process for molding the curtain attachment connector 4 shown in FIG. 1. Though not shown but will readily be understood by one having ordinary skill in the art, a mold assembly used in this process comprises a fixed mold having a cavity for molding a backside part of a fastener member 42 of the curtain attachment connector 4, a movable mold having a cavity for molding a front part of the fastener member 42, a split mold disposed on a mold surface of the movable mold and composed of two mold parts jointly defining a cavity for molding a hook member 41, and a group of split molds disposed on the mold surface of the movable mold and each two mold parts jointly defining a series of cavities for molding one row of hooks 43a. In operation, the movable mold and the associated split mold groups are moved toward the fixed mold to close the mold assembly. Then, a melted synthetic resin material is injected through a sprue and runners into the cavities in the mold assembly, and after that the mold assembly is cooled for an appropriate period. After the cooling, the mold assembly is opened. In this instance, the split mold for molding the hook member 41 and the split mold groups for molding the hooks 43a are opened first to remove a molded product. However, since a hook member 41 and hooks 43a of the fastener member 42 are left by adhesion within the corresponding cavities of the split molds, the molded product cannot be removed from the movable mold unless an external force is exerted on the molded product. Accordingly, after the mold assembly is opened, ejector pins are driven through the movable mold into pressure contact with the flat lands 43b (FIG. 1) of the molded product, thus forcing the molded product off the mold assembly.

As understood from the foregoing description, the male fastener surface 43 of the fastener member 42 has a portion forming a flat land 43b which is devoid of hooks 43a. The flat land 43b is adapted to be engaged with an ejector pin to ensure that the molded product can be smoothly removed from the mold assembly. In the illustrated embodiment, the number of the flat land 43b is two and each of the two flat lands 43b is disposed between the central group of hooks 43a in the five consecutive vertical tiers, and an outer group hooks 43a in two adjacent vertical tiers.

Since the hook member 41 and the fastener member 42 are united by a single injection molding operation, the curtain attachment connector 4 can be produced with high production efficiency. In addition, due to the flat lands 43b provided on the fastener surface 43 for engagement with ejector pins, the molded-product removing operation can be smoothly and reliably achieved by the ejector pins without damaging any hook 43a which would otherwise occur due to interference between each ejector pin and the hook 43a. Since the hook member 41 and the fastener member 42 are formed from a single material, coloring in the same color tone can readily be effected on the hook member 41 and the fastener member 42. Furthermore, the hook member 41 molded of synthetic resin, when used in combination with the synthetic resin curtain runner, is operable without damaging the synthetic resin runner and guarantees a long service life.

In each of the embodiments described above, the female surface-type fastener members 11 attached along the top edge of the curtain 1 are looped fastener tapes each including a number of fiber loops formed by weaving or knitting. The looped fastener tape 11 may be replaced by an injection-molded fastener member which is the same as the fastener member 42 of the curtain attachment connector 4 of the present invention. In this instance, however, consideration should be taken that the hooks 43a on the curtain attachment connector 4 and the hooks on the injection-molded fastener member 11 on the curtain 1 should be faced in opposite directions, and further that the hooks on the curtain side are preferably directed downward so as to make the engagement more resistant to accidental separation which may occur under the action of the gravity or the weight of the curtain 1.

As described above, the curtain attachment connector 4 of the present invention includes the hook member 41 adapted to be engaged with the curtain runner, and the blocking means 44 disposed at an opening 41a of the hook member 41 for preventing another article from entering the hook member 41 through the opening 41a. The blocking means 44 is deformable into the hook member 41 when subjected to an external force of a predetermined intensity which is as large as the force produced during the ordinary hook-member attaching operation. By the curtain attachment connector 4 of the present invention, a curtain 1 can readily be attached to and detached from the curtain guide member 2. Thus, the curtain replacement work can quite readily be accomplished with high efficiency. In addition, due to the presence of the blocking means 44, each hook member 41 is prevented from catching another hook member 41, and a cord 45 is prevented from getting entangled with the hook member 41 by the blocking member 44 when used to interconnect a series of curtain attachment connectors 4. The curtain attachment connector 4 having such blocking means 44 is easy to handle and store. This will further improve the efficiency of the curtain replacement operation.

Furthermore, the curtain attachment connector 4 has a one-piece, integrally molded structure and hence can be manufactured with high production efficiency. Since all the structural parts of the curtain attachment connector 4, such as a hook member 41 and a fastener member 42, are made of a single material, coordination in color and design with the curtain 1 can readily be achieved.

Figure 9:
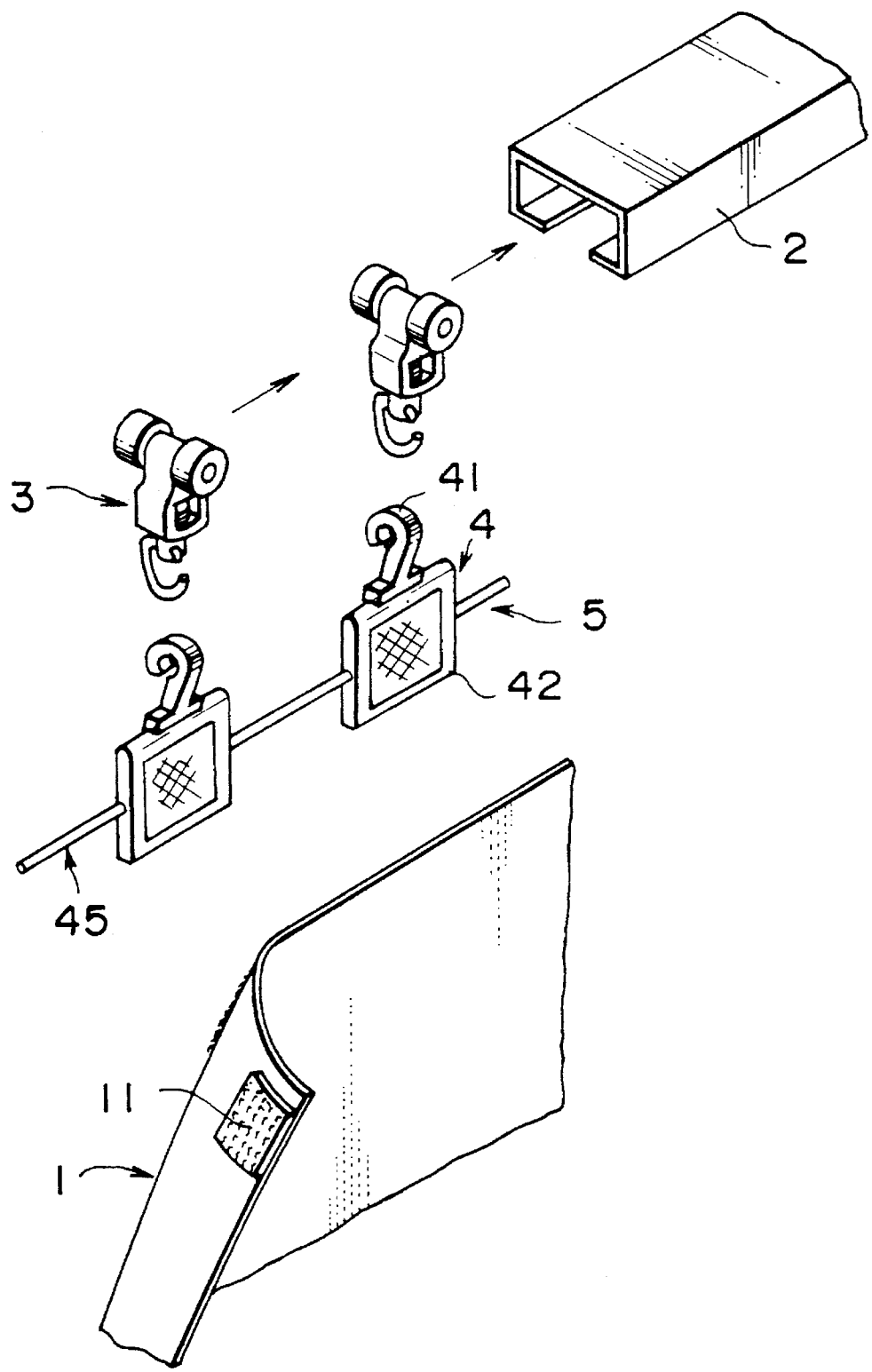
FIG. 9 is a perspective view illustrative of the manner in which the curtain is attached to a curtain runner via a curtain attachment connector without the blocking means according to another embodiment of the present invention.
Figure 10:
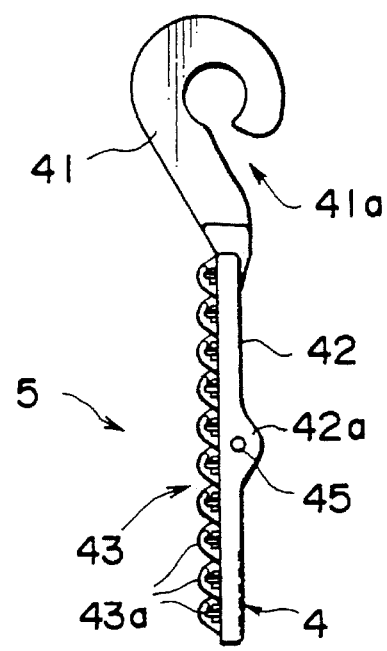
FIG. 10 is a side view showing the curtain attachment connector assembly without the blocking means.
Figure 11:
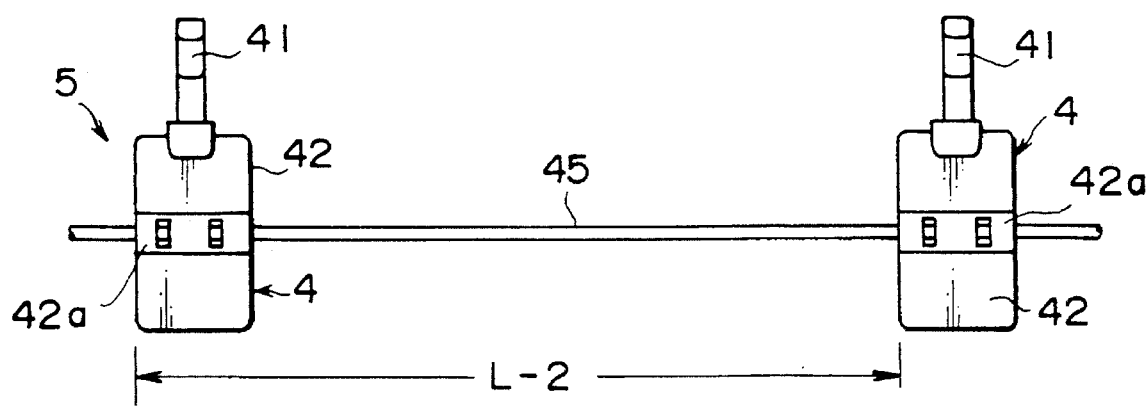
FIG. 11 is a rear view of the curtain attachment assembly shown in FIG. 10.

FIG. 9 shows another embodiment of the present invention in which a plurality of curtain attachment connectors 4 are used in the interconnected state, as shown in FIGS. 6 and 7. In the embodiment shown in FIGS. 10 and 11, a plurality of regularly spaced curtain attachment connectors 4 are interconnected by a cord 45 so as to jointly form a curtain attachment connector assembly 5 (FIG. 11). Each individual curtain attachment connector 4 has the same structure as the one shown in FIG. 6 with the exception that the curtain attachment connector 4 of FIGS. 9 to 11 does not have the blocking means 44 in the form of the resilient strip.

As shown in FIG. 11, the curtain attachment connectors 4 of the curtain attachment connector assembly 5 is interconnected by the cord 45 extending transversely across respective central portions of the fastener members 42. The cord 45 are made of the same material having the same property as the one in FIG. 7. The curtain attachment connectors 4 are molded integrally with the cord 45 by the above-described method. The fastener members 42 supported on the cord 45 along the length thereof are spaced at regular intervals or pitches L-2.

In this embodiment also, the pitch L-2 (FIG. 11) of the fastener members 42 is smaller, by a predetermined distance, than the pitch L-1 (FIG. 8) of the female or looped fastener tapes 11 attached to the curtain 1 along the top edge thereof. This arrangement is advantageous in the same manner as above-described embodiment shown in FIGS. 1 through 7.

Obviously, various minor changes and modifications of the present invention are possible in the light of the above teaching. It is therefore to be understood that within the scope of the appended claims the invention may be practiced otherwise than as specifically described.

Further, in the above embodiments, the surface-type fasteners are used for the curtain attachment connectors and for fastener members, however, other types of fasteners such as snap-type fasteners also may be used. Accordingly, fastener surface in this specification means engaging surface of the surface-type fastener and also, in the fastener members of other types, surfaces which engages each other.

What is claimed is:

1. A curtain attachment connector assembly for connecting a series of curtain hanger members slidably mounted on an elongated guide member and a top edge of a curtain including a series of separable fastener members mounted on and along the top edge at predetermined intervals, said curtain attachment connector assembly comprising:

(a) a plurality of curtain attachment connectors molded of synthetic resin and each including
      (i) a fastener member having a fastener surface releasably engageable with a fastener surface of each of the separable fastener members of the curtain, and
      (ii) a hook member integral with said fastener member and adapted to be attached to, and detached from, one of the curtain hanger members and having an opening, and a blocking means disposed at said opening of said hook member for preventing another article from entering said hook member through said opening, said blocking means being broken when an external force of a predetermined intensity is exerted thereon; and (b) at least one flexible cord interconnecting the respective fastener members of said curtain attachment connectors at predetermined intervals which is smaller than said intervals of said separable fastener members of the curtain.

2. A curtain attachment connector assembly according to claim 1, wherein said separable fastener member comprises a plurality of hooks or loops which engage with loops or hooks.

3. A curtain attachment connector assembly according to claim 1, wherein said flexible cord is integrally molded with said fastener members of said curtain attachment connectors.

4. A curtain attachment connector assembly according to claim 1, wherein said blocking means comprises a resilient strip extending across said opening of said hook member and integrally joined at opposite ends to said hook member, at least one of said opposite ends of said blocking means forming a frail portion which is breakable under said external force.

5. A curtain attachment connector assembly according to claim 1, wherein said blocking means comprises a resilient strip extending across said opening of said hook member and joined at opposite ends to said hook member, said blocking means having a notch located centrally between said opposite ends thereof and forming a frail portion which is breakable under said external force.

6. A curtain attachment connector molded of synthetic resin and adapted to be interposed between a curtain hanger member and a curtain for connecting the curtain hanger member and a top edge of the curtain, the curtain including a separable fastener member mounted on and along the top edge thereof, said curtain attachment connector comprising:

(a) a plate-like fastener member having a fastener surface releasably engageable with a fastener surface of the separable fastener member of the curtain;

(b) a hook member integral with said fastener member and adapted to be attached to, and detached from, said curtain hanger member, said hook member having an opening; and (c) blocking means disposed at said opening of said hook member for normally preventing another article from entering said hook member through said opening, said blocking means being broken when an external force of a predetermined intensity is exerted thereon.

7. A curtain attachment connector according to claim 6, wherein said separable fastener member comprises a plurality of hooks or loops which engage with loops or hooks.

8. A curtain attachment connector according to claim 6, wherein said blocking means comprises a resilient strip extending across said opening of said hook member and integrally joined at opposite ends to said hook member, at least one of said opposite ends of said resilient strip forming a frail portion which is breakable under said external force.

9. A curtain attachment connector according to claim 6, wherein said blocking means comprises a resilient strip extending across said opening of said hook member and joined at opposite ends to said hook member, said resilient strip having a notch located centrally between said opposite ends thereof and forming a frail portion which is breakable under said external force.

* * * * *